US007909248B1

(12) United States Patent
Goncalves

(10) Patent No.: US 7,909,248 B1
(45) Date of Patent: Mar. 22, 2011

(54) SELF CHECKOUT WITH VISUAL RECOGNITION

(75) Inventor: Luis Goncalves, Pasadena, CA (US)

(73) Assignee: Evolution Robotics Retail, Inc., Pasadena, CA (US)

( * ) Notice: Subject to any disclaimer, the term of this patent is extended or adjusted under 35 U.S.C. 154(b) by 157 days.

(21) Appl. No.: 12/229,069

(22) Filed: Aug. 18, 2008

Related U.S. Application Data

(60) Provisional application No. 60/965,086, filed on Aug. 17, 2007.

(51) Int. Cl.
*G06K 15/00* (2006.01)

(52) U.S. Cl. .... 235/383; 235/375; 235/385; 235/462.14

(58) Field of Classification Search .................. 235/375, 235/383, 385, 462.01–462.49, 472.01–472.03
See application file for complete search history.

(56) References Cited

U.S. PATENT DOCUMENTS

| | | | | |
|---|---|---|---|---|
| 4,929,819 | A | 5/1990 | Collins | |
| 5,115,888 | A | 5/1992 | Schneider | |
| 5,495,097 | A | 2/1996 | Katz et al. | |
| 5,543,607 | A | 8/1996 | Watanabe et al. | |
| 5,609,223 | A | 3/1997 | Lizaka et al. | |
| 5,883,968 | A | 3/1999 | Welch et al. | |
| 5,967,264 | A | 10/1999 | Lutz et al. | |
| 6,047,889 | A | 4/2000 | Williams et al. | |
| 6,069,696 | A | 5/2000 | McQueen et al. | |
| 6,236,736 | B1 | 5/2001 | Crabtree et al. | |
| 6,332,573 | B1 | 12/2001 | Gu et al. | |
| 6,363,366 | B1 | 3/2002 | Healy | |
| 6,540,137 | B1 * | 4/2003 | Forsythe et al. | 235/383 |

(Continued)

FOREIGN PATENT DOCUMENTS

| | | |
|---|---|---|
| EP | 0672993 | 9/1995 |

(Continued)

OTHER PUBLICATIONS

Ostrowski , "Systems and Methods for Merchandise Automatic Checkout", U.S. Appl. No. 12/074,263, filed Feb. 29, 2008 (assigned to assignee of the present application); corresponds to US 2009/0152348 cited above.

(Continued)

*Primary Examiner* — Thien M. Le
*Assistant Examiner* — Tuyen K Vo
(74) *Attorney, Agent, or Firm* — Stoel Rives LLP

(57) ABSTRACT

A system and method is disclosed for using object recognition/verification and weight information to confirm the accuracy of a UPC scan, or to provide an affirmative recognition where no UPC scan was made. In the preferred embodiment, the checkout system comprises: a universal product code (UPC) scanner configured to generate a product identifier; at least one camera for capturing one or more image of an item; a database of features and images of known objects; an image processor configured to: extract a plurality of geometric point features from the one or more images; identifying matches between the extracted geometric point features and the features of known objects; generate a geometric transform between the extracted geometric point features and the features of known objects for a subset of known objects corresponding to matches; and identify one of the known objects based on a best match of the geometric transform; and a transaction processor configured to execute one of a predetermined set of actions if the identified object is different than the product identifier.

23 Claims, 11 Drawing Sheets

U.S. PATENT DOCUMENTS

| | | | | |
|---|---|---|---|---|
| 6,550,583 | B1 | 4/2003 | Brenhouse | |
| 6,598,791 | B2 | 7/2003 | Bellis, Jr. et al. | |
| 6,606,579 | B1 | 8/2003 | Gu | |
| 6,741,177 | B2 | 5/2004 | Ballantyne | |
| 6,860,427 | B1 | 3/2005 | Schmidt et al. | |
| 6,915,008 | B2 | 7/2005 | Barman et al. | |
| 7,044,370 | B2 * | 5/2006 | Bellis et al. | 235/383 |
| 7,100,824 | B2 | 9/2006 | Ostrowski et al. | |
| 7,246,745 | B2 * | 7/2007 | Hudnut et al. | 235/383 |
| 7,325,729 | B2 | 2/2008 | Crockett et al. | |
| 7,334,729 | B2 * | 2/2008 | Brewington | 235/383 |
| 7,337,960 | B2 * | 3/2008 | Ostrowski et al. | 235/383 |
| 7,477,780 | B2 | 1/2009 | Boncyk et al. | |
| 2002/0138374 | A1 | 9/2002 | Jennings et al. | |
| 2003/0018897 | A1 | 1/2003 | Bellis, Jr. et al. | |
| 2003/0026588 | A1 * | 2/2003 | Elder et al. | 386/46 |
| 2005/0173527 | A1 * | 8/2005 | Conzola | 235/385 |
| 2005/0189411 | A1 * | 9/2005 | Ostrowski et al. | 235/383 |
| 2006/0261157 | A1 * | 11/2006 | Ostrowski et al. | 235/383 |
| 2006/0266824 | A1 * | 11/2006 | Hassenbuerger | 235/383 |
| 2006/0283943 | A1 | 12/2006 | Ostrowski | |
| 2007/0084918 | A1 | 4/2007 | Tabet et al. | |
| 2009/0152348 | A1 | 6/2009 | Ostrowski | |

FOREIGN PATENT DOCUMENTS

| | | |
|---|---|---|
| EP | 0689175 | 12/1995 |
| EP | 0843293 | 5/1998 |

OTHER PUBLICATIONS

Ostrowski, "Systems and Methods for Merchandise Checkout", U.S. Appl. No. 11/466,371, filed Aug. 22, 2006 (assigned to assignee of the present application); corresponds to US 2006/0283943 cited above; application has been allowed, issue fee paid.

* cited by examiner

SELF CHECKOUT WITH VISUAL RECOGNITION

CROSS-REFERENCE TO RELATED APPLICATION(S)

This application claims the benefit of U.S. Provisional Patent Application Ser. No. 60/965,086 filed Aug. 17, 2007, entitled “SELF CHECKOUT WITH VISUAL VERIFICATION,” which is hereby incorporated by reference herein for all purposes.

TECHNICAL FIELD

The invention generally relates to techniques for enabling customers and other users to accurately identify items to be purchased at a retail facility, for example. In particular, the invention relates to a system and method for using visual appearance and weight information to augment universal product code (UPC) scans in order to insure that items are properly identified and accounted for at ring up.

BACKGROUND

In many traditional retail establishments, a cashier receives items to be purchased and scans them with a UPC scanner. The cashier insures that all the items are properly scanned before they are bagged. As some retail establishments incorporate customer self-checkout options, the customer assumes the responsibility of scanning and bagging items with little or no supervision by store personnel. A small percentage of customers have used this opportunity to defraud the store by bagging items without having scanned them or by swapping an item’s UPC with the UPC of a lower priced item. Such activities cost retailers millions of dollars in lost income. There is therefore a need for safeguards to independently confirm that the checkout list is correct and discourage illegal activity while minimizing any inconvenience to the vast majority of honest and well-intentioned customers that properly scan their items.

SUMMARY

The invention according to certain preferred embodiments features a system and method for using object recognition/verification and weight information to confirm the accuracy of an optical code read (e.g., a UPC scan), or to provide an affirmative recognition where no UPC scan was made. In one example preferred embodiment, the checkout system comprises: a universal product code (UPC) scanner or other optical coder reader configured to generate a product identifier; at least one camera for capturing one or more images of an item; a database of features and images of known objects; an image processor configured to: extract a plurality of geometric point features from the one or more images; identifying matches between the extracted geometric point features and the features of known objects; generate a geometric transform between the extracted geometric point features and the features of known objects for a subset of known objects corresponding to matches; and identify one of the known objects based on a best match of the geometric transform; and a transaction processor configured to execute one of a predetermined set of actions if the identified object is different than the product identifier. In some additional embodiments, the transaction processor maintains one or more lists identifying items that must always be visually verified or verified by weight, or need not be visually verified and/or weight verified.

BRIEF DESCRIPTION OF THE DRAWINGS

The preferred embodiments are illustrated by way of example and not limitation in the figures of the accompanying drawings, and in which.

DETAILED DESCRIPTION OF THE PREFERRED EMBODIMENT

Figure 1:
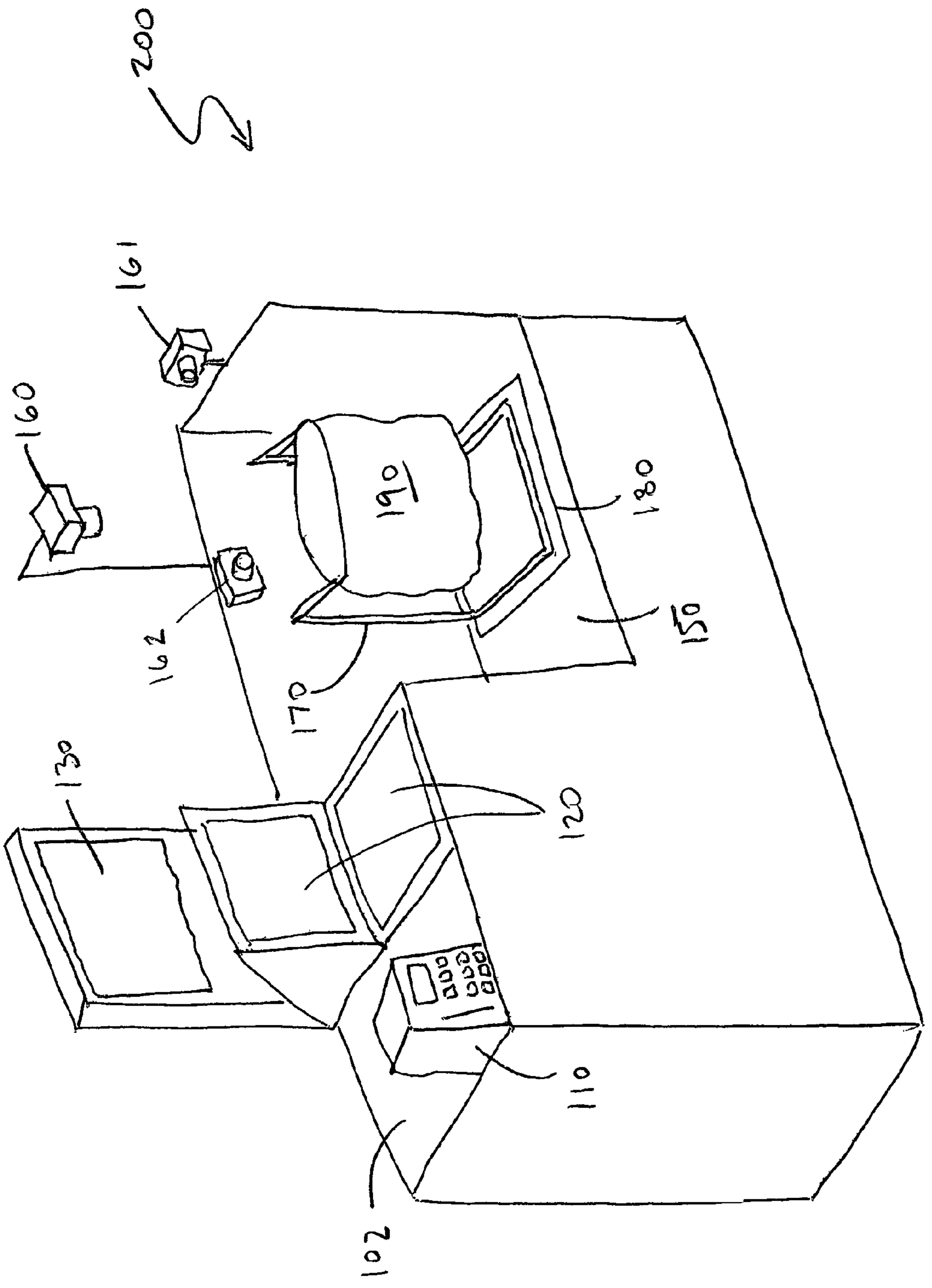
FIG. 1 is a perspective view of a self-checkout station having a belt conveyor with integral scale, in accordance with a first exemplary embodiment.
Figure 2:
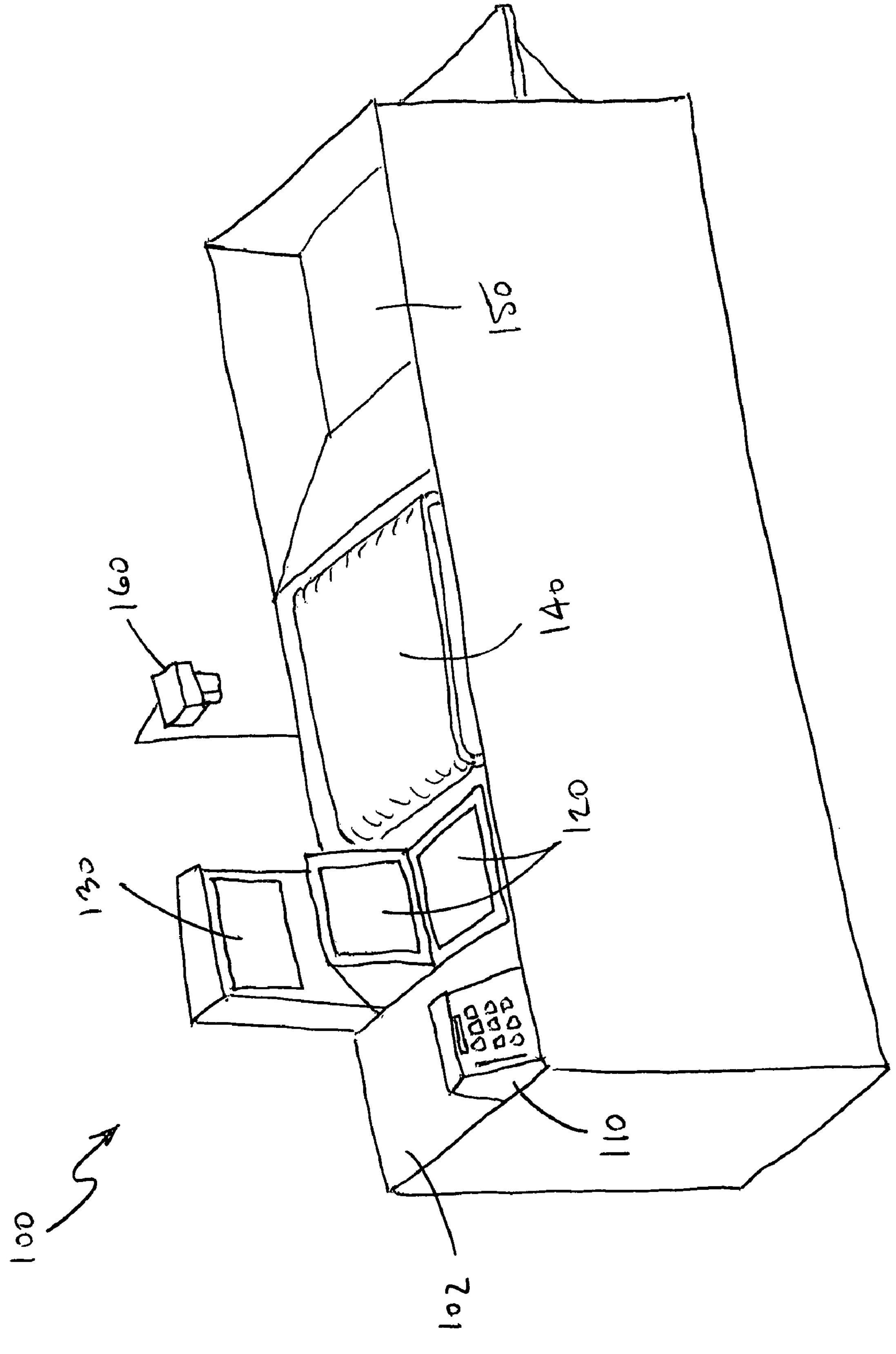
FIG. 2 is a perspective view of a self-checkout station having a bagging section with an integral scale, in accordance with a second exemplary embodiment.

Illustrated in FIG. 1 is a first embodiment and FIG. 2 a second embodiment of a checkout station at which customers can scan and pay for merchandise or other items at a grocery store or other retail facility for example. The self-checkout stations 100, 200 in these embodiments include a counter top 102, a data reader section (comprising a UPC scanner 120), and a downstream collection station (comprising a scale 180 for determining the weight of an item, and a bagging area 150 where scanned items are placed in shopping bags). One or more video cameras are trained on the counter and the bagging area for purposes of detecting the presence of and/or identifying items of merchandise as they are scanned and bagged. The UPC scanner 120 may take the form of a bed scanner that scans a UPC code from under glass, scanner gun that is aimed at the UPC, or visual sensor for capturing an image from which the UPC can be decoded, for example. In addition, the checkout station preferable includes a touch screen display device 130 and payment system for receiving cash, credit, and debit payments of merchandise.

In FIG. 1, the weight scale is incorporated into the bag rack 170 so as to measure the cumulative weight of items as they are placed into the shopping bag 190. The weight scale 180 is incorporated into the belt conveyor 140 in FIG. 2 so as to determine the weight of an item as it is passed to the bagging area 150. In still other embodiments, the scale is incorporated into the UPC scanner bed 120.

As shown in FIG. 1, a plurality of cameras 160-162 may be located in proximity to the bagging area to capture images of items while the items are being bagged, including one camera 162 that looks into the shopping bag 190 or above the bag so as to view items as they are being placed into the bag. As shown in FIG. 2, a camera 160 may be trained to capture images of items of the belt 140. The video cameras in the preferred embodiment are black/white cameras that capture images at a rate of about 30 frames per second, although various other black/white and color cameras may also be employed depending on the application.

Figure 3:
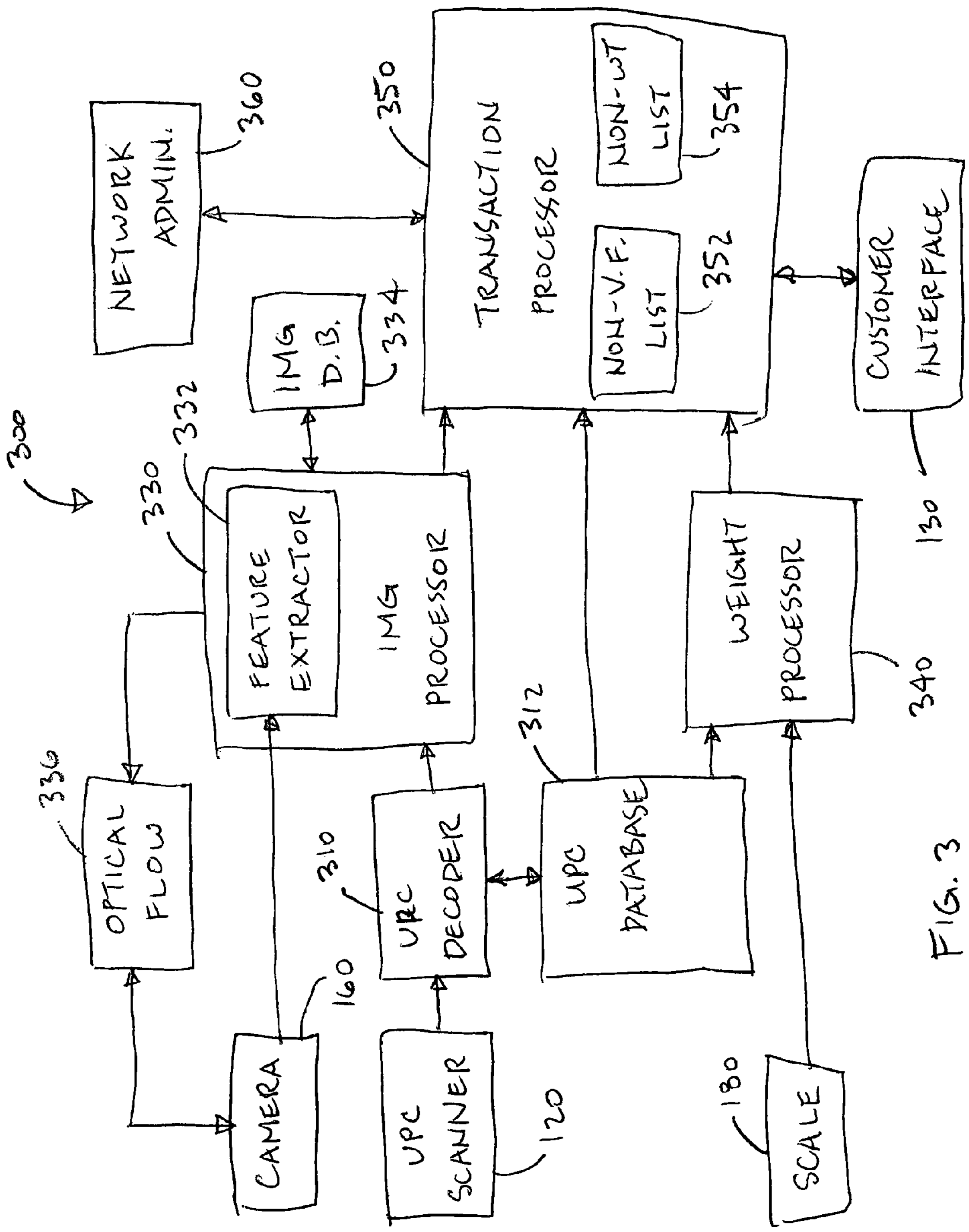
FIG. 3 is a view of a bagging area with a video camera configured to detect items as they are placed in the bag, in accordance with an exemplary embodiment.

Illustrated in FIG. 3 is a block diagram of the self-checkout system 300 of the exemplary embodiment. The system includes the UPC scanner 120, scale 180, and cameras 160 discussed above, as well as a UPC decoder 310 coupled to a UPC database 312 including item price and other information, a feature extractor 332 coupled to the one or more cameras, an image processor 330 coupled to a database 334 of image data, a weight processor 340 coupled to the scale, and a transaction processor 350 for conducting the transaction based on the available information from the UPC decoder, image processor, and weight processor.

The UPC scanner and UPC decoder are well known to those skilled in the art and therefore not discussed in detail here. The UPC database, which is also well known in the prior art, includes item name, price, and the weight of the item in pounds for example. The one or more video cameras transmit image data to a feature extractor which selects and processes a subset of those images. In the preferred embodiment, the feature extractor extracts geometric point features such as scale-invariant feature transform (SIFT) features, which is discussed in more detail in context of FIGS. 10 and 11. The extracted features generally consist of feature descriptors with which the image processor can either verify the identity of the item being purchased or recognize the item. When configured to do verification, the image processor confirms the identity of the item determined by the UPC scanner. In particular, the UPC receives the UPC code from the decoder, queries the image database using the UPC, retrieves a plurality of associated visual features, and compares the features of the object having that UPC with the features extracted from the one or more images of the item captured at the checkout station. The identity of the item is confirmed if, for example, a predetermined number of feature descriptors are matched with sufficient quality, an accurate geometric transformation exists between the set of matching features, the normalized correlation of the transformed model exceeds a predetermined threshold, or combination thereof. A signal is then transmitted to the transaction processor indicating whether the visual appearance of the item is consistent or inconsistent with the UPC code on the item.

In addition to verification, the self-checkout system can also recognize an item of merchandise based on the visual appearance of the item without the UPC code. As described above, one or more images are acquired and geometric point features extracted from the images. The extracted features are compared to the visual features of known objects in the image database. The identity of the item as well as its UPC code can then be determined based on the number and quality of matching visual features, an accurate geometric transformation between the set of matching features of the image and a model, the quality of the normalized correlation of the image to the transformed model, or combination thereof. In the preferred embodiment, the checkout system can be configured to do either verification or recognition by a system administrator 360 at the store or remotely located via a network connection, or configured to automatically perform recognition operations if and when verification cannot be implemented due to the absence of a UPC scan for example.

The checkout system further includes a scale and weight processor for performing item verification based on weight. In the preferred embodiment, the measured weight of the object is compared to the known weight of the object retrieved from the UPC database. If the measured weight and retrieved weight match within a determined threshold, the weight processor transmits a signal to the transaction processor indicating whether the item weight is consistent or inconsistent with the UPC code on the item.

At the transaction processor, the UPC data, visual verification/recognition signal, weight verification signal, or combination thereof are processed for purposes of implementing the sales transaction. At a minimum, the transaction processor communicates via the customer interface 130 to display purchase information on the touch screen and facilitate the financial transactions of the payment device. In addition, the verification/recognition process intervenes in the transaction by alerting a cashier of a potential problem or temporarily stopping the transaction when attendant (e.g., cashier) intervention is required. As explained in more detail below, the transaction processor decides whether to intervene in a transaction based on the consistency of the UPC, visual data, weight data, or lesser combination thereof.

In the normal course of operations, a customer using the self-checkout system will hover the item to be purchased over the UPC scanner bed until an audible tone confirms that the UPC scanner read the code. The user then transfers the item to the belt conveyor or bag area where the item's weight is determined. One or more cameras capture images of the item before it is placed in the bag. As such, the checkout system can typically confirm both the weight and visual appearance of the scanned item. If all data is consistent, the item is added to the checkout list. If the data is inconsistent, the system may be configured to implement one or more of a general set of responses:

A) If the image processor determines that the item identified by the UPC scanner is different than that determined by the visual features, the system can prompt the customer to scan/re-scan the UPC, allow the item to pass and the transaction to continue with an increased alert level, generate an alert if the accumulated alert level exceeds a predetermined threshold, or lock the transaction and alert a attendant/cashier if necessary;

B) If the UPC of the item is moved to the bagging area before the UPC scanned but its identity determined through the object recognition methodology discussed herein, for example, the system can implement one of the actions above, tentatively add the identified item to the list of items being purchased, or ask the customer whether he/she wants to include the item in the check out list;

C) If the extracted visual features cannot be verified/recognized or are otherwise inconsistent with the UPC and weight, the system can implement the actions above or disregard the appearance of the item when the item associated with the UPC is inherently difficult or impractical to visualize, as is the case with small items like packs of gum or items with few unique visual features; and D) If the weight of the item is inconsistent with the UPC and/or visual features of the item, the system can implement the actions above or disregard the weight measurement when the item associated with the UPC is difficult to accurately weigh or place on the scale, as is the case with lightweight items like greeting cards or like paper goods and with heavy items like cases of drinks.

In some embodiments, the action taken is based at least in part on the value of the difference in price between the UPC-identified item and the item identified based on visual features.

In some embodiments, a first list 352 of items whose visual appearance is ignored if inconsistent with the UPC and weight because of its unreliability; and second list 354 of items whose weight is ignored if inconsistent with the UPC and visual features, thereby intelligently determining if and when to continue with a transaction if some of the data acquired about the item is inconsistent. In contrast, the system may maintain one or more additional lists of items that must be visually verified or recognized, and a list of items whose weight must be verified in order for the item to be added to the checkout list. In the absence of this visual or weight verification, the transaction processor prompts the user to rescan the item, generate an alert, or lock the transaction.

Figure 4:
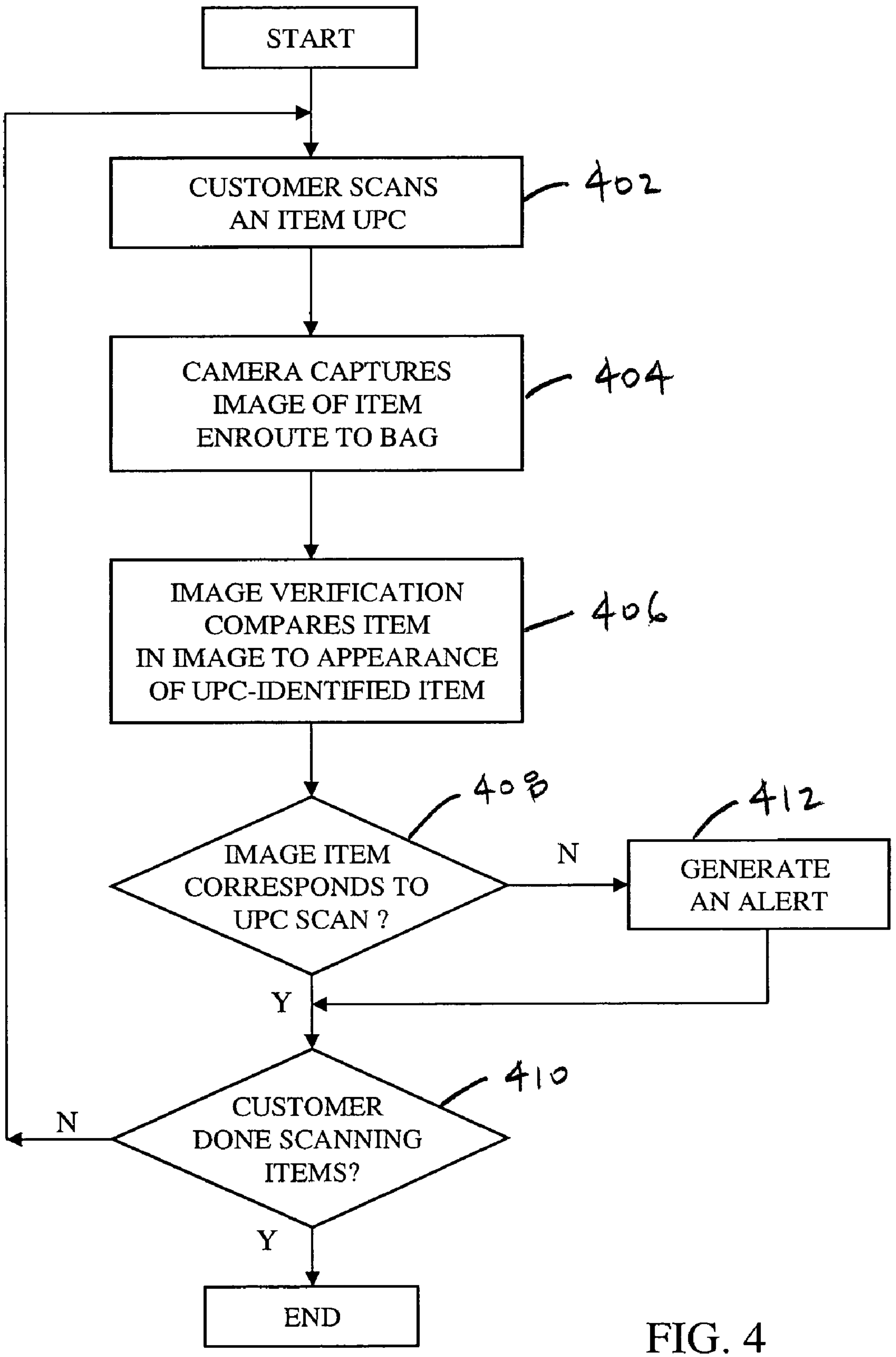
FIG. 4 is a flowchart of method of visually verifying the identify of an item in conjunction with a UPC scan, in accordance with a second exemplary embodiment.

Several flowcharts of representative procedures for acquiring product information and inconsistencies are shown in FIGS. 4 through 7. Illustrated in FIG. 4 is a flowchart of an exemplary procedure for addressing inconsistencies between the UPC and the product appearance using visual verification. After the customer scans the item UPC, the UPC is decoded and associated UPC data retrieved. The UPC is also used by the image processor to retrieve a plurality of visual features associated with that item. In parallel, cameras capture a series of images of the item enroute to the bagging area. The number and frequency of images selected for feature extraction may be determined using an optical flow module which is configured to detect movement in the direction of the bagging area. In particular, the optical flow module may use image subtraction or image correlation in order to distinguish an item in the presence of a static background. The selected images are transmitted to the feature extractor which identifies points of image contrast and generates a feature descriptor based on image data at those points. The extracted features are compared, to the retrieved visual feature features for purposes to determine whether the item corresponds to the UPC, in accordance with the verification methodology discussed in context FIG. 8. If the verification is successful, the price of the item is rung up and the customer repeats the UPC scanning operation. If a match is not detected, the system may take one of several actions discussed above including generating an alert to notify store personnel to attend to the situation.

Figure 5:
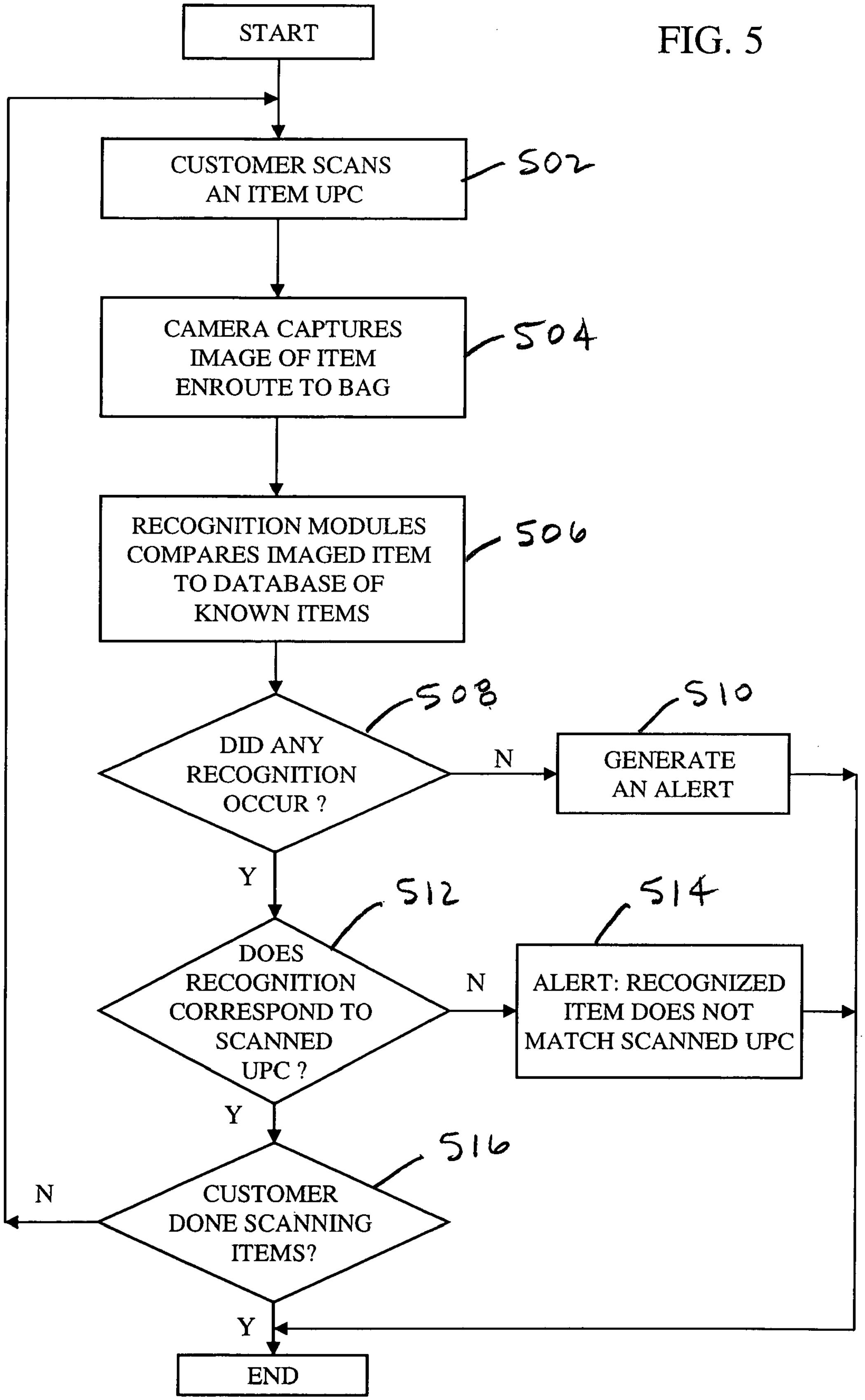
FIG. 5 is a flowchart of a method of visually recognizing one or more items in conjunction with a UPC scan, in accordance with an exemplary embodiment.

Illustrated in FIG. 5 is a flowchart of an exemplary procedure for addressing inconsistencies between the UPC and the product appearance using object recognition. In the process of purchasing an item, the customer scans 502 the item UPC and one or more images of the item are captured 504 before the item is placed in the bag. As before, the UPC is decoded and associated UPC data retrieved. Concurrently, the image data is transmitted to the feature extractor and the feature descriptors compared to the feature descriptors of the plurality of known objects in the image database. This process of image recognition 506 may result in no matches, the one best match, or a plurality of candidate matches. If no known items are identified after feature comparison, decision block 508 is answered in the negative and the system may take one or more actions including: asking the customer to remove the item from the bag and rescan, lock the register to prevent the transaction from proceeding, allow the item to pass but increase the alert level, or call store personnel if the alert level exceeds a threshold. If one or more items are identified through the recognition process, decision block 508 is answered in the affirmative and the transaction processor determines if the scanned UPC corresponds to an identified item. If UPC and visual appearance match, decision block 512 is answered in the affirmative and the item is added to the checkout list and the customer is requested to scan another item or conclude the transaction with payment (block 516). If, however, the UPC does not match the visual appearance, decision block 512 is answered in the negative and the transaction processor can execute 514 one of the actions above or other preselected action such as asking the customer if he/she would like to accept the item for ring up.

Figure 6:
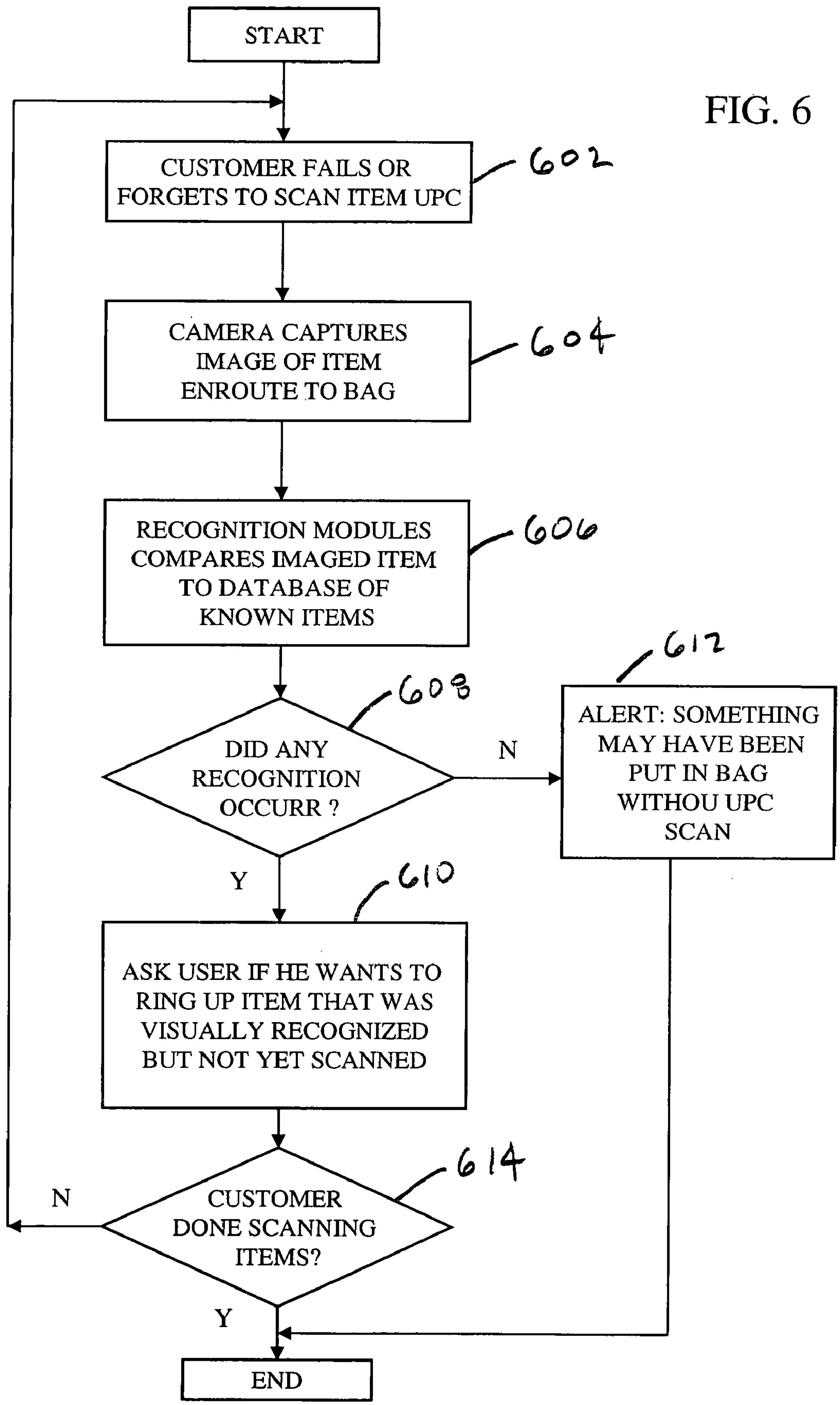
FIG. 6 is a flowchart of a method of performing automatic ring up of items without scanning the UPC, in accordance with an exemplary embodiment.

Illustrated in FIG. 6 is a flowchart of an exemplary procedure for automatically adding an item to the checkout list. Periodically, a customer attempts to scan 602 the item UPC but the operation fails if the UPC tag is damaged or due to operator error. In these situations, one or more images of the item may be captured 604 at the UPC scanner or before the item is placed in the bag. Using the image data, the geometric point features are extracted and compared at the image processor to the feature of the plurality of known objects in the image database. This process of image recognition 606 may result in no matches, the one best match, or a plurality of candidate matches. If no known items are identified after feature comparison, decision block 608 is answered in the negative and the system may take one or more actions 612 including: asking the customer to remove the item from the bag and rescan, lock the register to prevent the transaction from proceeding, allow the item to pass but increase the alert level, or call store personnel if the alert level exceeds a threshold. If recognition occurred and a known item identified through the recognition process, decision block 608 is answered in the affirmative and the transaction processor transmits 610 the name of the product and its price to the touch screen display for example and asks the user if he/she wants to purchase this item. Based on the customer response, the item is rung up or omitted from the checkout list. If omitted, the optical flow module may be configured to detect motion out of the bag and capture images corresponding to the removal of an item from the bag, these images preferably the recognition methodology to confirm that the same item is, in fact, removed from the bag.

Figure 7:
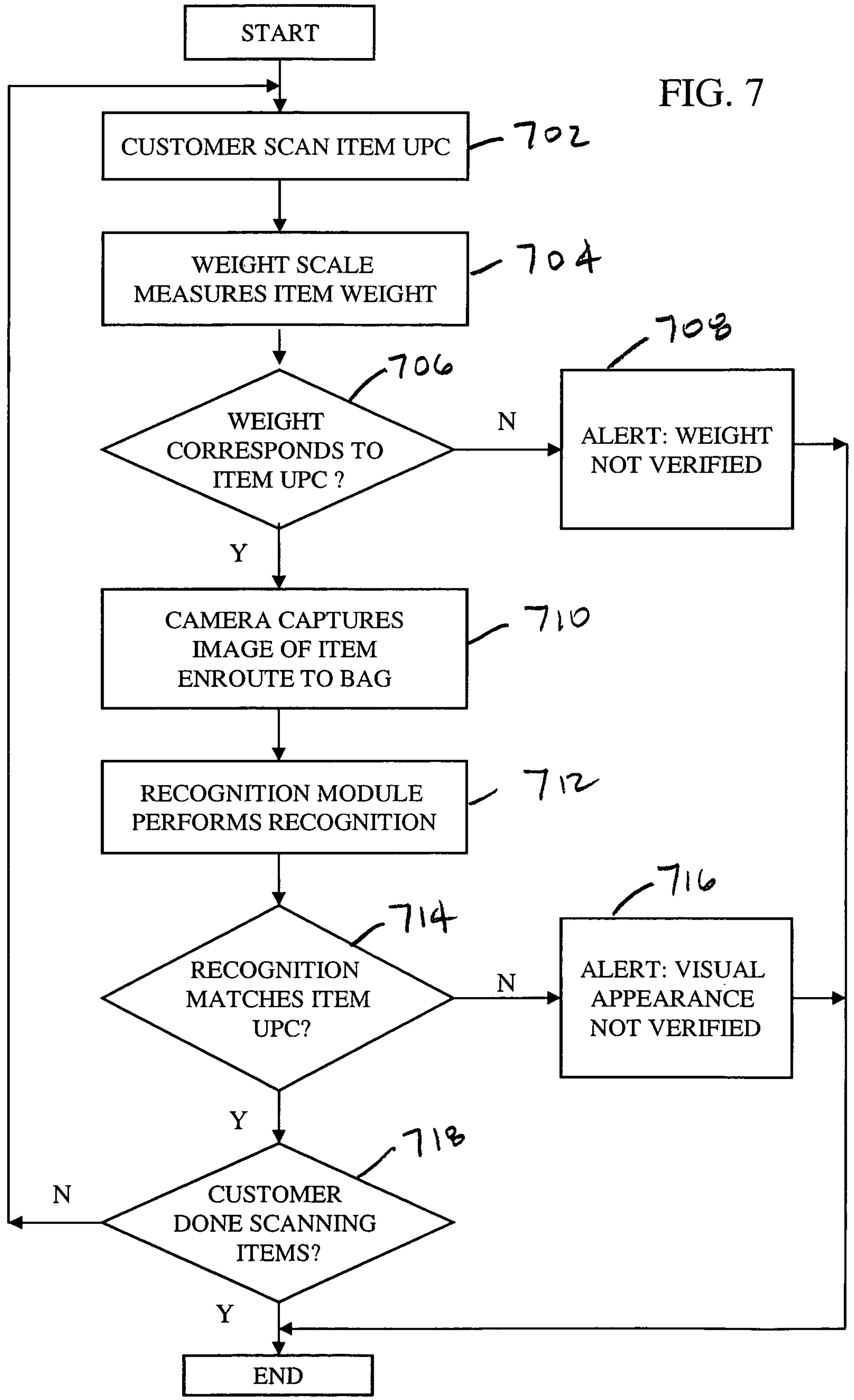
FIG. 7 is a flowchart of a method of performing visual verification and weight verification of an item in conjunction with a UPC scan, in accordance with an exemplary embodiment.

Illustrated in FIG. 7 is a flowchart of an exemplary procedure for implementing visual and weight verification. The customer scans 702 the item UPC, and then transfers the item to bagging area with an integral scale or belt conveyor with integral scale where the item is weighed 704. In the process, the system captures 710 one or more images enroute to the bag. The UPC is used retrieve the known weight of the item which is compared to the measure weight. If the known and measured weights are within a predetermined threshold 706; the image processor proceeds to perform objection recognition 712 by means of feature extraction and feature comparison, as described above. If the weights do not match and the weight not verified 708, the transaction processor either ignores the inconsistency because the weight is difficult to measure accurately, or the processor prompts the user to remove the item from the bagging area/conveyor and rescan it, lock the register to prevent the transaction from proceeding, allow the item to pass but increase the alert level, or call store personnel if the alert level exceeds a threshold. If the weight inconsistency is ignored, the transaction processor relies on a visual confirmation 714 of the UPC using either the verification or recognition methodology described above. If the visual appearance matches the UPC, decision block 714 is answered in the affirmative and the item is added to the checkout list and the transaction proceeds with the customer scanning 718 the next item.

Figure 8:
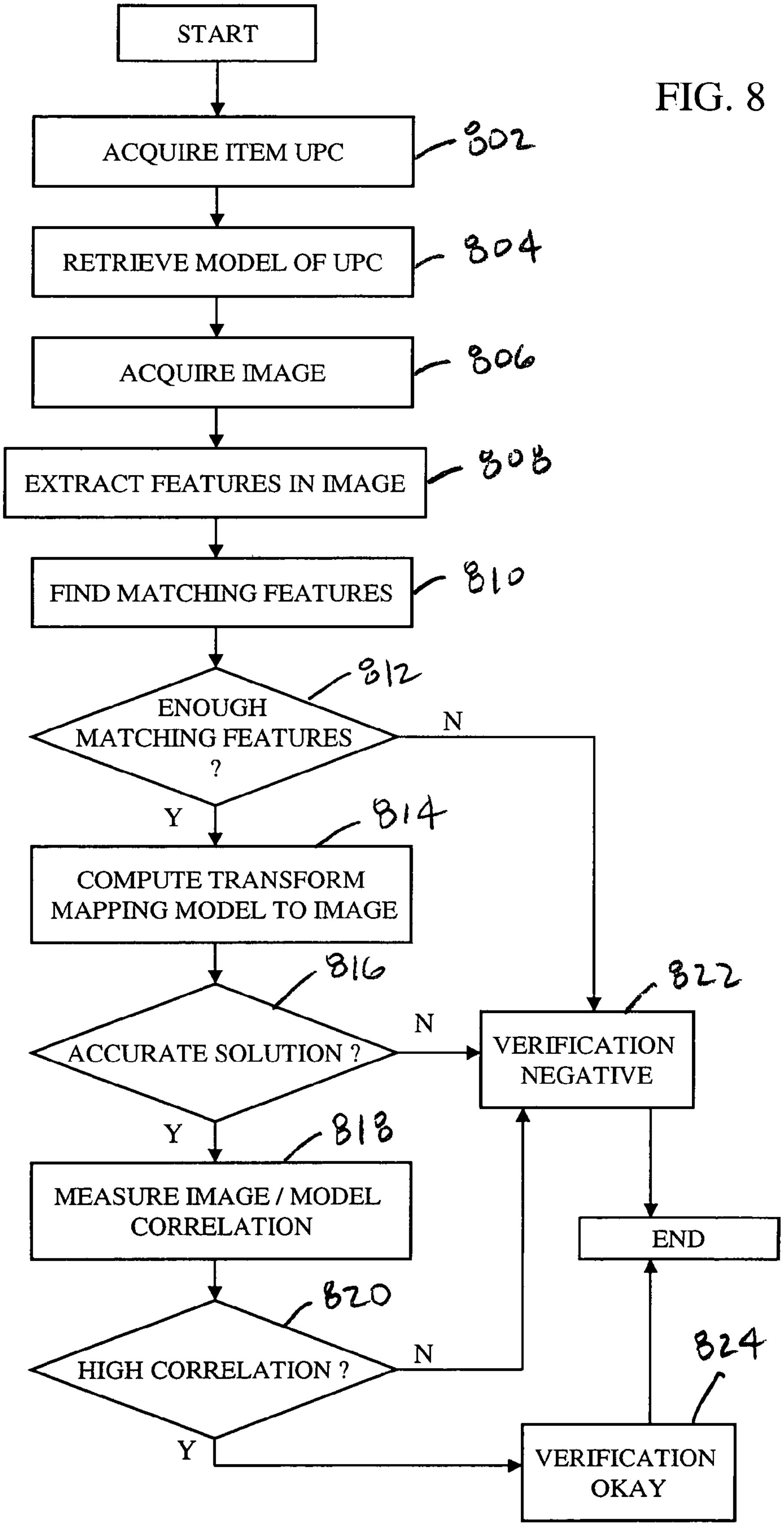
FIG. 8 is a detailed flowchart of a method of performing visual verification, in accordance with an exemplary embodiment.

Illustrated in FIG. 8 is an exemplary methodology for executing visual appearance-based verification, as employed in the procedures above. After the UPC is scanned 802 and one or more images are acquired 806, the UPC is used by the image processor to query and retrieve 804 the image database for the visual features of the item. The visual features correspond to a model of the item which includes a plurality of visual descriptors that characterize image data at points in the image of relatively high contrast, the geometric or spatial relationship between those features on each of the sides of the item, and pictures of multiple sides of the item acquired at approximately the same distance observed between the item on the checkout station counter and a camera. The acquired images, in contrast, are processed to extract 808 the geometric point features, which are compared 810 to the retrieved point features. Next, the acquired images are tested 812 to determine whether the item depicted corresponds to the item identified by the UPC by comparing the extracted features to the plurality of retrieved features in order to identify matching features. If a sufficient number of extracted features match retrieved features to within a predetermined threshold, decision block 812 is answered in the affirmative and the geometric relationship of the features is tested 814. In particular, the known matching visual features are mapped 814 to the image using an affine transformation or homography transform, for example. If the mapped features fit the visual image with an error below a predetermined threshold, decision block 816 is answered in the affirmative and the extracted features yield a solution of sufficient accuracy. As a final confirmation, one or more of the images retrieved from the model using the UPC are correlated 818 against the captured images at the region of the image from which the matching features were extracted. If the correlation matches to within a predefined threshold, decision block 820 is answered in the affirmative and the correlation is matched and the identity of the product verified 824. If one or more of the tests—feature comparison, affine transform mapping, or image correlation—fail to match to within the associated error margin, the visual confirmation is negative 822 and the item generally not added to the checkout list without the item being rescanned.

Figure 9:
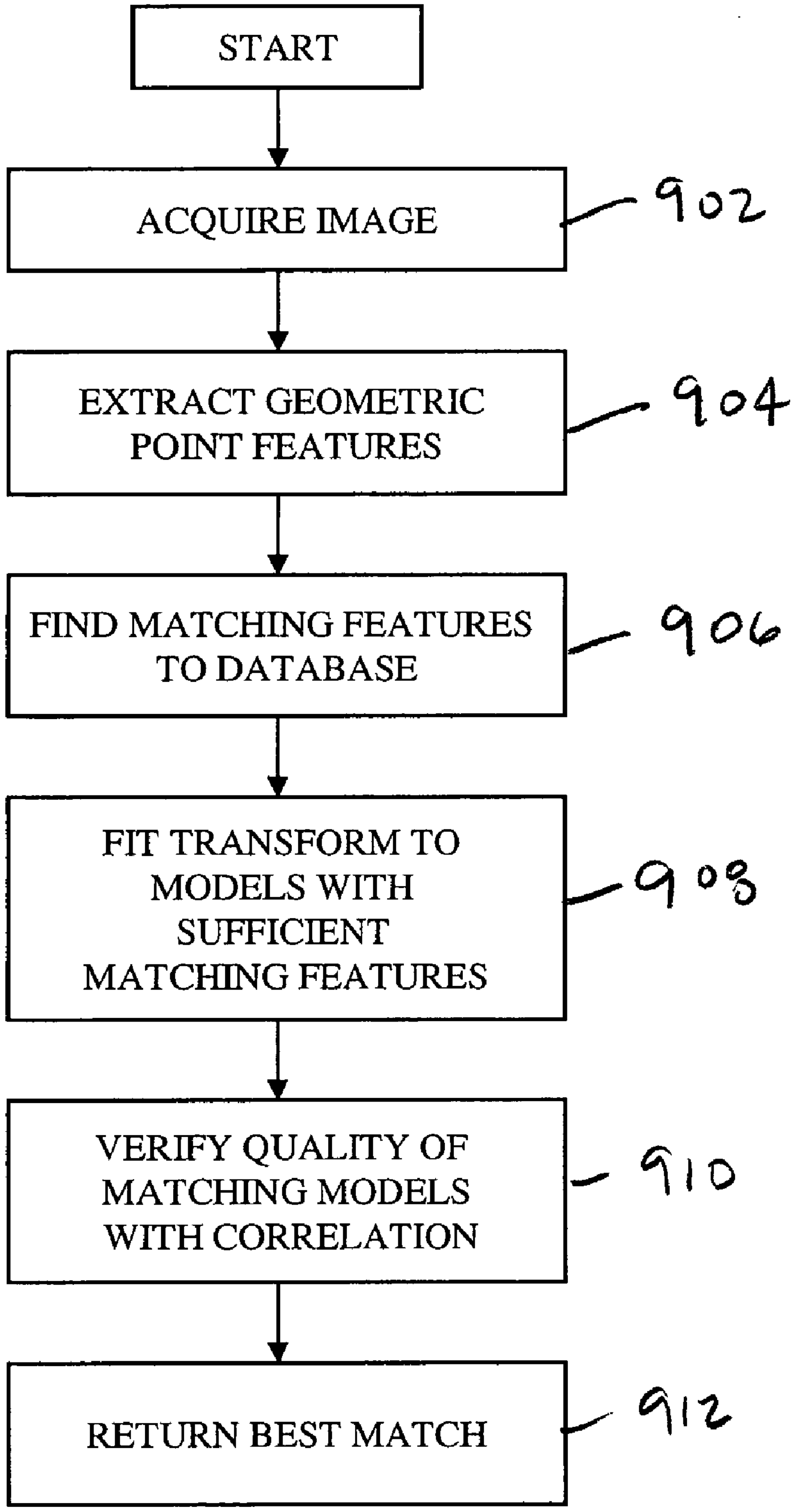
FIG. 9 is a detailed flowchart of a method of performing visual recognition, in accordance with an exemplary embodiment.

Illustrated in FIG. 9 is an exemplary method of visual recognition as used in one or more of the methodologies above. The acquired images 902 are processed to extract 904 the plurality of geometric point features. The extracted point features are compared 906 to each of the visual features of the image database. In general, the extracted features frequently match at least a small number of features from a plurality of item models. If a sufficient number of extracted features match the features of a given model, the correspondence between features is sufficiently high that the item associated with the model set aside as a candidate for further testing. In particular, the known matching visual features are fitted or mapped 908 to the image using an affine transformation, for example. If the mapped features fit the visual image with a residual error below a predetermined threshold, the extracted features are sufficiently accuracy. The models that fail to meet this test are culled from further testing. The models that satisfied the affine matching test undergo a final confirmation in which images associated with the candidate models are correlated 910 against the captured images in the region of the matching features. If the correlation matches to within a predefined threshold, the correlation confirms the identity of the item which is then reported to the transaction processor for inclusion in the checkout list, for example. In general, the affine transformation yields a small number of candidate items, generally products from the same manufacturer with similar packaging. After the correlation, however, generally only one item qualifies as a best match 912 and this item is included in the checkout list. The one or more items that fails one of more of the tests—feature comparison, affine transform mapping, or image correlation—are disregarded. If a different item is recognized, the customer is given the option of including the item in the checkout list, or other option listed above.

Figure 10:
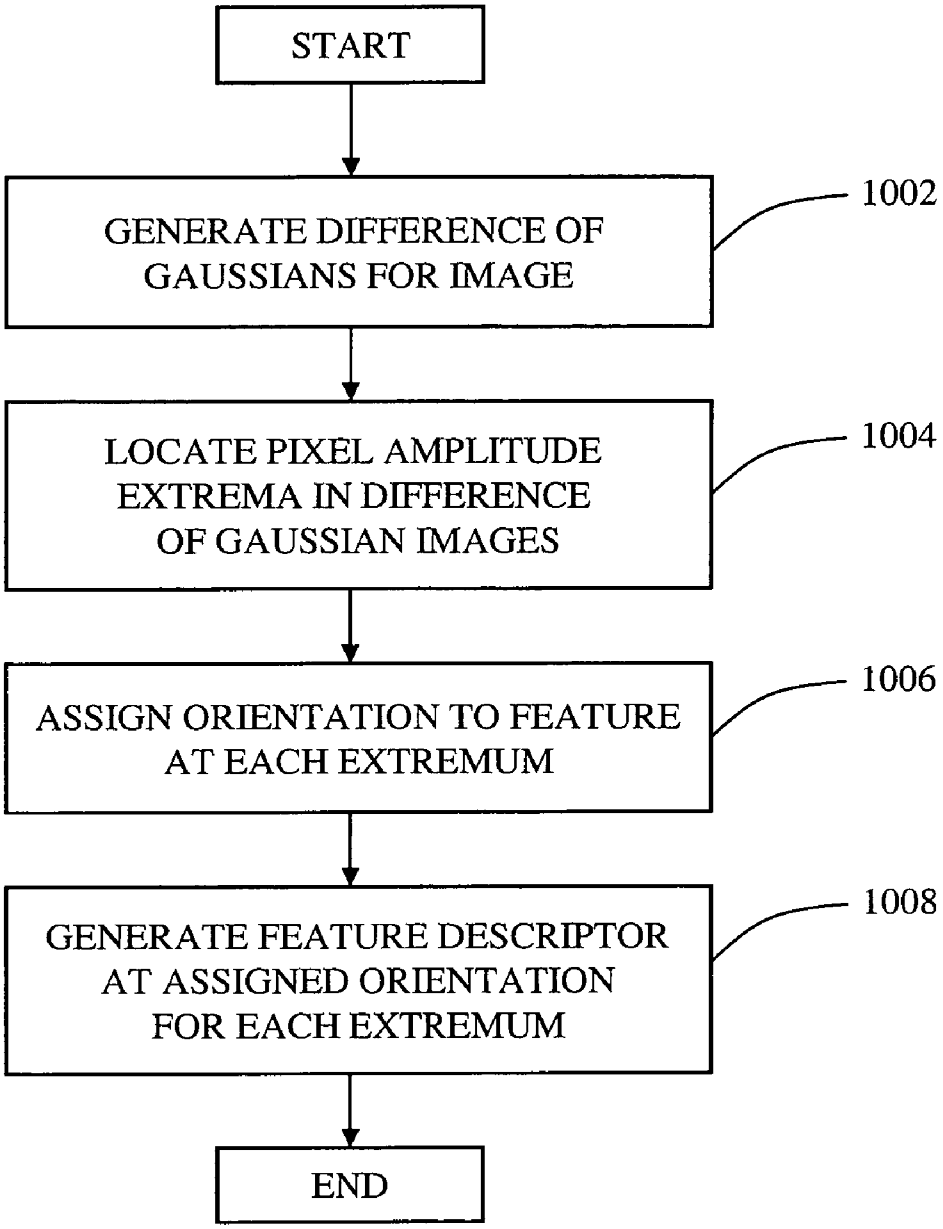
FIG. 10 is a flowchart of a scale-invariant feature transform (SIFT) methodology, in accordance with an exemplary embodiment.

Illustrated in FIG. 10 is a flowchart of the method of extracting scale-invariant visual features in the preferred embodiment. Visual features are extracted 1002 from any given image by generating a plurality of Difference-of-Gaussian (DoG) images from the input image. A Difference-of-Gaussian image represents a band-pass filtered image produced by subtracting a first copy of the image blurred with a first Gaussian kernel from a second copy of the image blurred with a second Gaussian kernel. This process is repeated for multiple frequency bands—that is, at different scales—in order to accentuate objects and object features independent of their size and resolution. While image blurring is achieved using a Gaussian convolution kernel of variable width, one skilled in the art will appreciate that the same results may be achieved by using a fixed-width Gaussian of appropriate variance and variable-resolution images produced by down-sampling the original input image.

Each of the DoG images is inspected to identify the pixel extrema including minima and maxima. To be selected, an extremum must possess the highest or lowest pixel intensity among the eight adjacent pixels in the same DoG image as well as the nine adjacent pixels in the two adjacent DoG images having the closest related band-pass filtering, i.e., the adjacent DoG images having the next highest scale and the next lowest scale if present. The identified extrema, which may be referred to herein as image "keypoints," are associated with the center point of visual features. In some embodiments, an improved estimate of the location of each extremum within a DoG image may be determined through interpolation using a 3-dimensional quadratic function, for example, to improve feature matching and stability.

With each of the visual features localized, the local image properties are used to assign an orientation to each of the keypoints. By consistently assigning each of the features an orientation, different keypoints may be readily identified within different images even where the object with which the features are associated is displaced or rotated within the image. In the preferred embodiment, the orientation is derived from an orientation histogram formed from gradient orientations at all points within a circular window around the keypoint. As one skilled in the art will appreciate, it may be beneficial to weight the gradient magnitudes with a circularly-symmetric Gaussian weighting function where the gradients are based on non-adjacent pixels in the vicinity of a keypoint. The peak in the orientation histogram, which corresponds to a dominant direction of the gradients local to a keypoint, is assigned to be the feature's orientation.

With the orientation of each keypoint assigned, the feature extractor generates 408 a feature descriptor to characterize the image data in a region surrounding each identified keypoint at its respective orientation. In the preferred embodiment, the surrounding region within the associated DoG image is subdivided into an M×M array of subfields aligned with the keypoint's assigned orientation. Each subfield in turn is characterized by an orientation histogram having a plurality of bins, each bin representing the sum of the image's gradient magnitudes possessing a direction within a particular angular range and present within the associated subfield. As one skilled in the art will appreciate, generating the feature descriptor from the one DoG image in which the inter-scale extrema is located insures that the feature descriptor is largely independent of the scale at which the associated object is depicted in the images being compared. In the preferred embodiment, the feature descriptor includes a 128 byte array corresponding to a 4×4 array of subfields with each subfield including eight bins corresponding to an angular width of 45 degrees. The feature descriptor in the preferred embodiment further includes an identifier of the associated image, the scale of the DoG image in which the associated keypoint was identified, the orientation of the feature, and the geometric location of the keypoint in the associated DoG image.

The process of generating 1002 DoG images, localizing 1004 pixel extrema across the DoG images, assigning 1006 an orientation to each of the localized extrema, and generating 1008 a feature descriptor for each of the localized extrema may then be repeated for each of the two or more images received from the one or more cameras trained on the shopping cart passing through a checkout lane.

Figure 11:
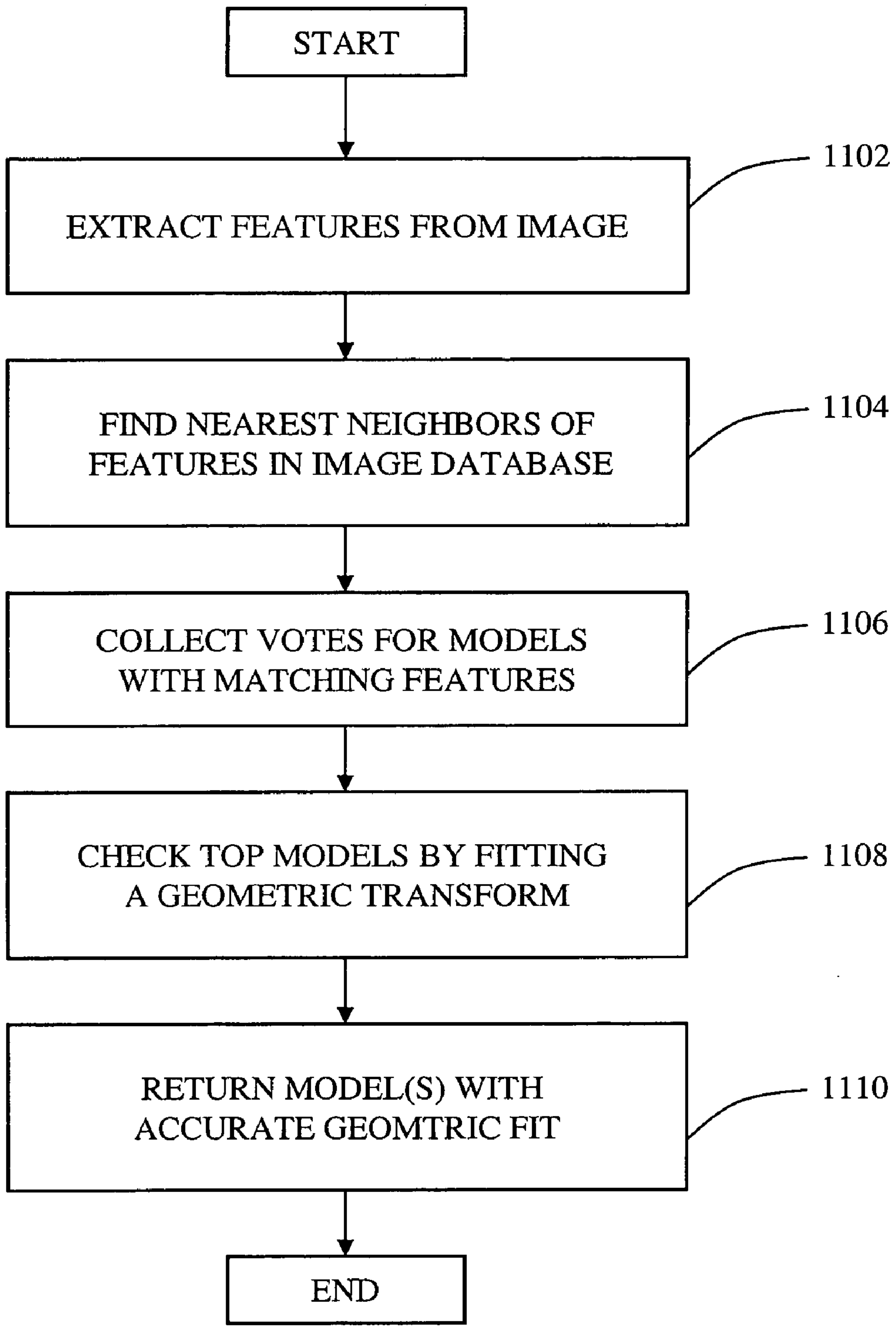
FIG. 11 is a flowchart of a method of visually recognizing an item of merchandise or like object, in accordance with an exemplary embodiment.

Illustrated in FIG. 11 is a flowchart of the method of recognizing items given an image and a database of models. As a first step, each of the extracted feature 1102 descriptors of the image is compared 1104 to the features in the database to find nearest neighbors. Two features match when the Euclidian distance between their respective SIFT feature descriptors is below some threshold. These matching features, referred to here as nearest neighbors, may be identified in any number of ways including a linear search ("brute force search"). In the preferred embodiment, however, the pattern recognition module 256 identifies a nearest-neighbor using a Best-Bin-First search in which the vector components of a feature descriptor are used to search a binary tree composed from each of the feature descriptors of the other images to be searched. Although the Best-Bin-First search is generally less accurate than the linear search, the Best-Bin-First search provides substantially the same results with significant computational savings. After a nearest-neighbor is identified, a counter associated with the model containing the nearest neighbor is incremented to effectively enter a "vote" 1106 to ascribe similarity between the model with respect to the particular feature. In some embodiments, the voting is performed in a 5 dimensional space where the dimensions are model ID or number, and the relative scale, rotation, and translation of the two matching features. The models that accumulate a number of "votes" in excess of a predetermined threshold are selected for subsequent processing as described below.

With the features common to a model identified, the image processor determines 504 the geometric consistency between the combinations of matching features. In the preferred embodiment, a combination of features (referred to as "feature patterns") are aligned using an affine transformation, which maps 1108 the coordinates of features of one image to the coordinates of the corresponding features in the model. If the feature patterns are associated with the same underlying object, the feature descriptors characterizing the object will geometrically align with small difference in the respective feature coordinates.

The degree to which a model matches (or fails to match) can be quantified in terms of a "residual error" computed 506 for each affine transform comparison. A small error signifies a close alignment between the feature patterns which may be due to the fact that the same underlying object is being depicted in the two images. In contrast, a large error generally indicates that the feature patterns do not align, although common feature descriptors match individually by coincidence. The one or more models with the smallest residual error is returned as the best match 1110.

The SIFT methodology described above has also been extensively taught in U.S. Pat. No. 6,711,293 issued Mar. 23, 2004, which is hereby incorporated by reference herein. The correlation methodology described above is also taught in U.S. patent application Ser. No. 11/849,503, filed Sep. 4, 2007, which is hereby incorporated by reference herein.

In another embodiment, the system implements a scale-invariant and rotation-invariant technique referred to as Speeded Up Robust Features (SURF). The SURF technique uses a Hessian matrix composed of box filters that operate on points of the image to determine the location of features as well as the scale of the image data at which the feature is an extremum in scale space. The box filters approximate Gaussian second order derivative filters. An orientation is assigned to the feature based on Gaussian-weighted, Haar-wavelet responses in the horizontal and vertical directions. A square aligned with the assigned orientation is centered about the point for purposes of generating a feature descriptor. Multiple Haar-wavelet responses are generated at multiple points for orthogonal directions in each of 4×4 sub-regions that make up the square. The sum of the wavelet response in each direction, together with the polarity and intensity information derived from the absolute values of the wavelet responses, yields a four-dimensional vector for each sub-region and a 64-length feature descriptor. SURF is taught in: Herbert Bay, Tinne Tuytelaars, Luc Van Gool, "SURF: Speeded Up Robust Features", Proceedings of the ninth European Conference on Computer Vision, May 2006, which is hereby incorporated by reference herein.

One skilled in the art will appreciate that there are other feature detectors and feature descriptors that may be employed in combination with the embodiments described herein. Exemplary feature detectors include: the Harris detector which finds corner-like features at a fixed scale; the Harris-Laplace detector which uses a scale-adapted Harris function to localize points in scale-space (it then selects the points for which the Laplacian-of-Gaussian attains a maximum over scale); Hessian-Laplace localizes points in space at the local maxima of the Hessian determinant and in scale at the local maxima of the Laplacian-of-Gaussian; the Harris/Hessian Affine detector which does an affine adaptation of the Harris/Hessian Laplace detector using the second moment matrix; the Maximally Stable Extremal Regions detector which finds regions such that pixels inside the MSER have either higher (brighter extremal regions) or lower (dark extremal regions) intensity than all pixels on its outer boundary; the salient region detector which maximizes the entropy within the region, proposed by Kadir and Brady; and the edge-based region detector proposed by June et al; and various affine-invariant feature detectors known to those skilled in the art.

Exemplary feature descriptors include: Shape Contexts which computes the distance and orientation histogram of other points relative to the interest point; Image Moments which generate descriptors by taking various higher order image moments; Jet Descriptors which generate higher order derivatives at the interest point; Gradient location and orientation histogram which uses a histogram of location and orientation of points in a window around the interest point; Gaussian derivatives; moment invariants; complex features; steerable filters; and phase-based local features known to those skilled in the art.

One or more embodiments may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments.

Therefore, the invention has been disclosed by way of example and not limitation, and reference should be made to the following claims to determine the scope of the present invention.

I claim:

1. An automated self-checkout system for point-of-sale, comprising a data reader section including an optical code reader having a read volume and configured to read an optical code on an item being passed by a user through the read volume and generate a product identifier of the item;

a downstream collection section comprising a bagging area within which items read by the optical code reader are collected as placed therein by the user after the user having passed the items through the read volume;

at least one camera disposed with a field of view of the collection section for capturing one or more images of the item within the bagging area;

a database of features and images of known objects;

an image processor configured to a) extract a plurality of visual features from the one or more images of the item, b) identify matches between the extracted visual features and the features of known objects, c) generate a geometric transform between the extracted visual features and the features of known objects for a subset of known objects corresponding to the matches, and d) identify one of the known objects based on a best match of the geometric transform; and a transaction processor configured to execute at least one of a predetermined set of actions if the known object that has been identified is different than the item corresponding to the product identifier.

2. The checkout system of claim 1, wherein the image processor is further configured to:

determine a correlation between the one or more images and images of the subset of known objects; and identify one of the known objects based, in part, on the determined correlation.

3. The checkout system of claim 1, wherein the geometric transform is a homography transform.

4. The checkout system of claim 1, wherein the geometric transform is affine transform.

5. The checkout system of claim 1, wherein the geometric point features are scale-invariant feature transform (SIFT) features.

6. The checkout system of claim 1, wherein the predetermined set of actions is selected from the group consisting of: prompting the user to read the optical code, prompting the user to re-read the optical code, adding a price of the item to a checkout list, increasing an alert level, preventing a payment system from processing payment, and alerting a cashier.

7. The checkout system of claim 1, wherein the predetermined set of actions comprises taking action based at least in part on the value of a difference in price between the known object and the item corresponding to the product identifier.

8. The checkout system of claim 1, wherein the predetermined set of actions comprises prompting the user to remove the item from the bagging area and replacing the item back into the bagging area.

9. The checkout system of claim 1, further comprising a bag disposed within the bagging area, wherein the camera is disposed with a field of view of an opening of the bag, wherein the processor is further configured to verify that an item placed in the bag corresponds to an item previously read by the optical code reader.

10. The checkout system of claim 9, wherein the predetermined set of actions comprises prompting the user to remove the item from the bag and replacing the item back into the bag.

11. The checkout system of claim 1, wherein the visual features that are extracted consist of geometric point features.

12. The checkout system of claim 1 further comprising an optical flow module configured to detect movement in the bagging area.

13. The checkout system of claim 12 wherein the optical flow module is configured to detect motion of an item out of the bag and capture images corresponding to removal of an item from the bag, wherein the images are processed to confirm that a selected item has been removed from the bag.

14. A method of self-checkout at point of sale station, the station having (1) a data reader section including an optical code reader with a read volume and configured to read an optical code on an item being passed by a user through the read volume and generate a product identifier of the item and (2) a downstream collection section comprising a bagging section within which items read by the optical code reader are collected as placed therein by the user after having passed them through the read volume, the method comprising the steps of a user passing an item bearing an optical code through the read volume of the optical code reader within the data reader section;

reading the optical code with the optical code reader, the optical code reader generating a product identifier of the item;

the user placing an item into the bagging section;

by means of at least one camera disposed with a field of view of the bagging section, capturing one or more images of the item placed into the bagging section; and by means of a processor, (a) accessing a database of features and images of known objects, (b) extracting a plurality of visual features from the one or more images of the item, (c) identifying matches between the extracted visual features and the features of known objects, (d) generating a geometric transform between the extracted visual features and the features of known objects for a subset of known objects corresponding to the matches, (e) identifying one of the known objects based on a best match of the geometric transform; and executing one of a predetermined set of actions if the known object that has been identified from the extracted visual features is different than the item corresponding to the product identifier.

15. A method according to claim 14, wherein the predetermined set of actions is selected from the group consisting of: prompting the user to read the optical code, prompting the user to re-read the optical code, adding a price of the item to a checkout list, increasing an alert level, preventing a payment system from processing payment, and alerting a cashier.

16. A method according to claim 14, wherein the predetermined set of actions comprises taking action based at least in part on the value of a difference in price between the known object and the item corresponding to the product identifier.

17. A method according to claim 14, wherein a bag is disposed within the bagging section, and wherein the camera is disposed with a field of view of an opening of the bag, the method further comprising by means of the processor, verifying that an item placed in the bag corresponds to an item previously read by the optical code reader.

18. A method according to claim 17, wherein if a known object is unable to be identified, prompting the user to remove the item from the bag and replace the item back into the bag repeating the step of capturing one or more images of the item placed into the bagging section.

19. A method according to claim 17 further comprising generating a list of items that do not require verifying.

20. A method according to claim 14, wherein the step of extracting a plurality of visual features from the one or more images of the item comprises extracting geometric point features.

21. A method according to claim 14, wherein the predetermined set of actions comprises increasing an alert level and generating an alert if the alert level exceeds a given threshold.

22. A method of self-checkout at point of sale station, the station having (1) a data reader section including an optical code reader with a read volume and configured to read an optical code on an item being passed by a user through the read volume and generate a product identifier of the item and (2) a downstream collection section comprising at least one of a bagging area and a conveyor section within which items read by the optical code reader are collected having been placed therein by the user after having passed them through the read volume, the method comprising the steps of via the optical code reader, identifying items by attempting to read the optical code on each item as it is passed through the read volume;

the user moving an item into the collection section;

by means of at least one camera disposed with a field of view of the collection section, capturing one or more images of the item moved into the downstream section;

by means of a processor, (a) accessing a database of features and images of known objects, (b) extracting a plurality of visual features from the one or more images of the item, (c) identifying matches between the extracted visual features and the features of known objects, (d) generating a geometric transform between the extracted visual features and the features of known objects for a subset of known objects corresponding to the matches, (e) identifying one of the known objects based on a best match of the geometric transform;

determining whether the known object identified in the collection section does not correspond to any item having been identified by the optical code reader in a current transaction;

if the known object identified in the collection section is determined to not correspond to any item having been identified by the optical code reader in a current transaction, taking a remedial action selected from the group consisting of: adding the known object identified to a list of items being purchased, and inquiring of the user whether the known object identified is desired to be added the list of items being purchased.

23. A method according to claim 22 wherein the step of taking a remedial action selected from the group comprising adding the known object identified to the list of items being purchased, notifying the user that the known object identified has been so added.

* * * * *